(12) United States Patent
Hollaway, Jr. et al.

(10) Patent No.: US 9,286,220 B2
(45) Date of Patent: *Mar. 15, 2016

(54) PROVISION OF EARLY DATA FROM A LOWER LEVEL CACHE MEMORY

(71) Applicant: INTERNATIONAL BUSINESS MACHINES CORPORATION, Armonk, NY (US)

(72) Inventors: John T. Hollaway, Jr., Austin, TX (US); Charles F. Marino, Round Rock, TX (US); Eric E. Retter, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/037,021

(22) Filed: Sep. 25, 2013

(65) Prior Publication Data

US 2014/0310472 A1   Oct. 16, 2014

Related U.S. Application Data

(63) Continuation of application No. 13/862,867, filed on Apr. 15, 2013, now Pat. No. 9,176,877.

(51) Int. Cl.
*G06F 12/00* (2006.01)
*G06F 12/08* (2006.01)

(52) U.S. Cl.
CPC ........ *G06F 12/0811* (2013.01); *G06F 12/0831* (2013.01); *G06F 12/0833* (2013.01); *G06F 12/0864* (2013.01)

(58) Field of Classification Search
CPC . G06F 12/00; G06F 12/0811; G06F 12/0815; G06F 12/082
USPC .................. 711/100, 117, 118, 128, 154, 200
See application file for complete search history.

(56) References Cited

U.S. PATENT DOCUMENTS 5,457,683 A * 10/1995 Robins .......................... 370/258
6,405,285 B1    6/2002 Arimilli et al.
(Continued)

OTHER PUBLICATIONS

Tendler et al.; "POWER7 Processors: The Beat Goes On"; Date of submitted document: Mar. 22, 2013. pp. 1-50.
(Continued)

*Primary Examiner* — Tuan Thai
(74) *Attorney, Agent, or Firm* — Russell Ng PLLC; Steven Bennett

(57) ABSTRACT

In response to snooping a read-type memory access request of a requestor on a system fabric of a data processing system, a memory channel interface forwards the request to a memory buffer and starts a timer. In response to the forwarded request, the memory buffer performs a lookup of a target address of the request in a memory controller cache. In response to the target address hitting in a coherence state permitting provision of early data, the memory buffer provides a response indicating early data and provides a copy of a target memory block of the request to the memory channel interface. The memory channel interface, responsive to receipt prior to expiration of the timer of the response indicating early data, transmits the copy of the target memory block to the requestor via the system fabric prior to receiving a combined response of the data processing system to the request.

6 Claims, 7 Drawing Sheets

(56) References Cited

U.S. PATENT DOCUMENTS

| | | | |
|---|---|---|---|
| 6,412,030 B1* | 6/2002 | Adusumilli | 710/33 |
| 8,117,322 B1* | 2/2012 | McQuade | 709/228 |
| 8,627,030 B2 | 1/2014 | Akkary et al. | |
| 2008/0162868 A1 | 7/2008 | Glew | |
| 2009/0172303 A1 | 7/2009 | Welc et al. | |
| 2013/0019050 A1* | 1/2013 | Somanache et al. | 711/103 |

OTHER PUBLICATIONS

H. Q. Le et al. "IBM POWER6 microarchitecture"; IBM J. Res & Dev., vol. 51 No. 6, Nov. 2007 (24 pg).

U.S. Appl. No. 13/862,867 entitled "Provision of Early Data From a Lower Level Cache Memory"; Notice of Allowance dated Jun. 24, 2015.

* cited by examiner

PROVISION OF EARLY DATA FROM A LOWER LEVEL CACHE MEMORY

PRIORITY CLAIM

This application is a continuation of U.S. patent application Ser. No. 13/862,867, entitled "PROVISION OF EARLY DATA FROM A LOWER LEVEL CACHE MEMORY," filed on Apr. 15, 2013, the disclosure of which is incorporated herein by reference in its entirety for all purposes.

BACKGROUND OF THE INVENTION

The present invention relates in general to data processing, and in particular, to decreasing data access latency in a data processing system by providing early data from a lower level cache memory.

In high performance computer systems, the design trend over many years has been to scale systems to ever larger numbers of processor chips, each having an ever increasing number of processor cores. Increasing the number of processor cores increases the volume of data consumed by execution of the processor cores, and accordingly places pressure on external data storage devices (e.g., dynamic random access memory (DRAM), magnetic and optical disks, flash drives, storage area networks (SANs), etc.) and the associated interconnects to supply the required volume of data.

In particular, DRAM access latency, while continuing to slowly improve over recent years, has not kept pace with increases in processor core clock rates. Consequently, external memory access latency, as measured relative to processor clock rates, has actually degraded. The conventional technique for compensating for external memory access latency has been to implement larger and deeper on-chip cache hierarchies to buffer frequently used data closer to the consuming processor cores. However, limits in overall chip sizes forces a tradeoff between the number of processor cores and the amount of cache memory on the chip. Consequently, the opportunity to improve effective memory access latency simply by increasing on-chip cache capacity is limited.

BRIEF SUMMARY

In at least one embodiment, in response to snooping a read-type memory access request of a requestor on a system fabric of a data processing system, a memory channel interface forwards the request to a memory buffer and starts a timer. In response to the forwarded request, the memory buffer performs a lookup of a target address of the request in a memory controller cache. In response to the target address hitting in a coherence state permitting provision of early data, the memory buffer provides a response indicating early data and provides a copy of a target memory block of the request to the memory channel interface. The memory channel interface, responsive to receipt prior to expiration of the timer of the response indicating early data, transmits the copy of the target memory block to the requestor via the system fabric prior to receiving a combined response of the data processing system to the request.

DETAILED DESCRIPTION

Figure 1:
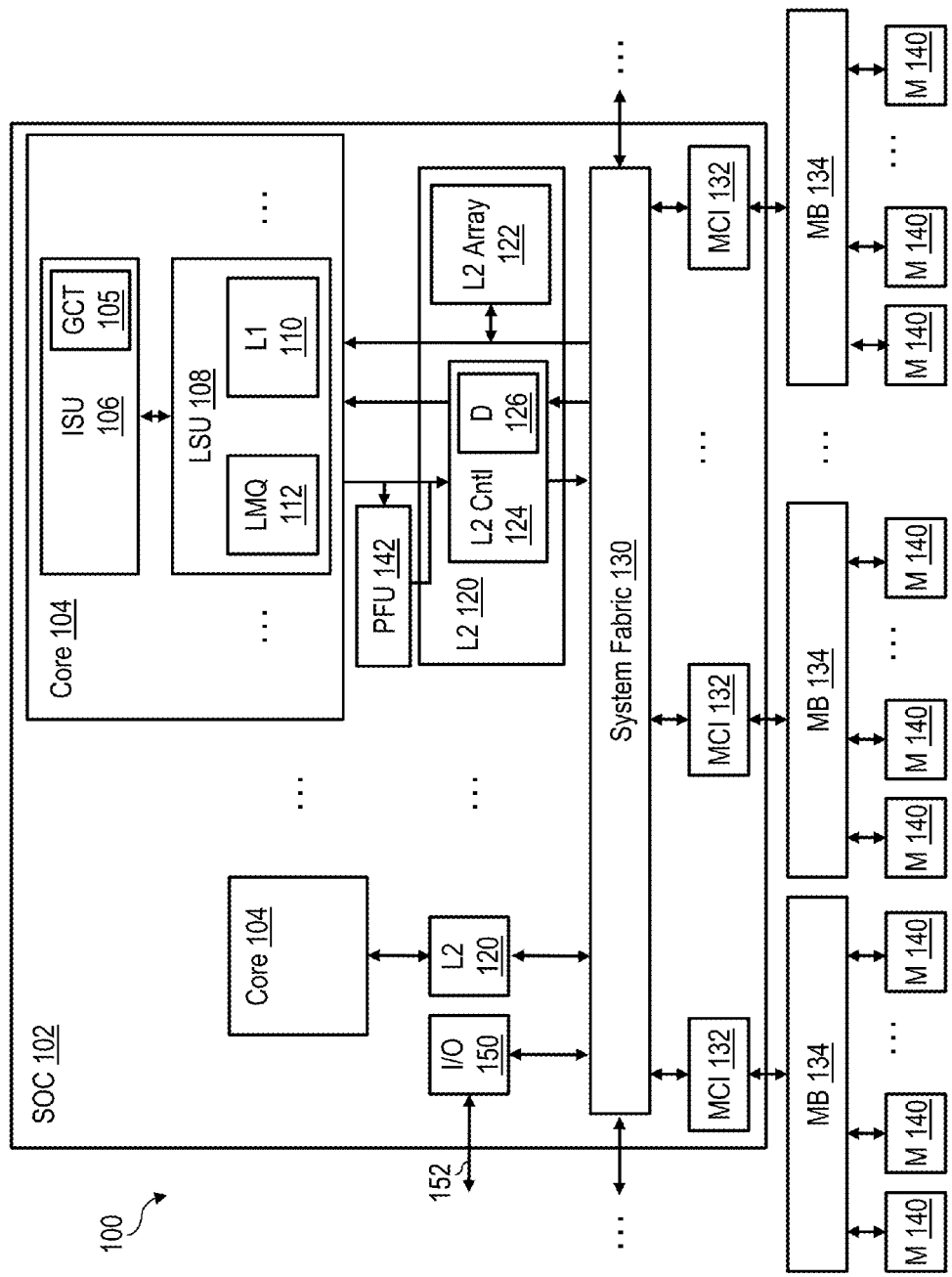
FIG. 1 is a high level block diagram of an exemplary data processing system in accordance with one embodiment.

With reference now to the figures and with particular reference to FIG. 1, there is illustrated a high level block diagram of an exemplary data processing system 100 that is one of the numerous possible embodiments of a data processing system in accordance with the principles and techniques disclosed herein. Data processing system 100 may be implemented, for example, with one of the IBM Power servers, a product line of International Business Machines Corporation of Armonk, N.Y.

In the depicted embodiment, data processing system 100 includes at least one system-on-a-chip (SOC) 102, and as indicated by elliptical notation, possibly numerous SOCs 102 coupled by system fabric 130 integrated within the SOCs 102. Each SOC 102 is preferably realized as a single integrated circuit chip having a substrate in which semiconductor circuitry is fabricated as is known in the art. Each SOC 102 includes multiple processor cores 104 that independently process instructions and data. In some embodiments, processor cores 104 further support simultaneous multithreading in which multiple independent threads are concurrently executed. Each processor core 104 includes an instruction sequencing unit (ISU) 106 for fetching instructions, ordering the instructions for execution, and completing the instructions by committing the results of execution to the architected state of the processor core 104. ISU 106 completes instructions by reference to a global completion table (GCT) 105.

Each processor core 104 further includes one or more execution units for executing instructions such as, for example, fixed and floating point arithmetic instructions, logical instructions, and load-type and store-type instructions that respectively request read and write access to a target memory block in the coherent address space of data processing system 100. In particular, the execution units include a load-store unit (LSU) 108 that executes the load-type and store-type instructions to compute target addresses of read and write memory access operations. LSU 108 includes a store-through level one (L1) cache 110 from which read memory access operations can be satisfied, as well as a load miss queue (LMQ) 112 that tracks read memory access operations that miss in L1 cache 110.

The operation of each processor core 104 is supported by a multi-level hierarchical memory subsystem having at its lowest level one or more shared system memories 140 (e.g., bulk DRAM) generally accessible by any of processor cores 104 in any of the SOCs 102 in data processing system 100, and at its upper levels, one or more levels of cache memory. As depicted, SOC 102 includes one or more (and preferably multiple) memory channel interfaces (MCIs) 132, each of which supports read and write accesses to an associated collection of system memories 140 in response to memory access operations received via system fabric 130 from processor cores 104 in the same SOC 102 or other SOCs 102. In the depicted embodiment, each MCI 132 is coupled to its associated collection of system memories 140 via an external memory buffer (MB) 134. Each pair of an MCI 134 and MB 134 thus forms a distributed memory controller.

In the illustrative embodiment, the cache memory hierarchy supporting each processor core 104 of SOC 102 includes the store-through level one (L1) cache 110 noted above and a private store-in level two (L2) cache 120. As shown, L2 cache 120 includes an L2 array 122 and an L2 controller 124, which includes control logic and a directory 126 of contents of L2 array 122. L2 controller 124 initiates operations on system fabric 130 and/or accesses L2 array 122 in response to memory access (and other) requests received from the associated processor core 104. In an embodiment in which a snoop-based coherency protocol is implemented (as will be hereafter assumed unless otherwise noted), L2 controller 124 additionally detects operations on system fabric 130, provides appropriate coherence responses, and performs any accesses to L2 array 122 required by the snooped operations. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

As will be appreciated, with current technologies the memory access latency experienced by a processor core 104 for requests serviced by a system memory 140 can be significantly greater than that for memory access requests serviced by an L2 cache 120. For example, in one embodiment, L1 cache 110 can be accessed in a single processor core clock cycle, a local L2 cache 120 can be accessed in approximately 3-5 processor core clock cycles, and off-chip system memories 140 can be accessed in 300-400 processor core clock cycles. Each core 104 therefore preferably has an associated core prefetch unit (PFU) 142 that prefetches memory blocks of data in advance of need from lower levels of the memory hierarchy (e.g., lower level cache or system memory 140) into higher levels of the memory hierarchy (e.g., L1 cache 110 and/or L2 cache 120) based on observed spatial locality in demand access patterns of the associated core 104.

SOC 102 further includes one or more integrated I/O (input/output) interfaces 150 supporting I/O communication via one or more external communication links 152 with one or more I/O controllers, such as PCI host bridges (PHBs), Infini-Band controllers, FibreChannel controllers, etc. Those skilled in the art will appreciate that data processing system 100 can include many additional or alternative components, which are not necessary for an understanding of the invention set forth herein are accordingly not illustrated in FIG. 1 or discussed further herein.

Figure 2:
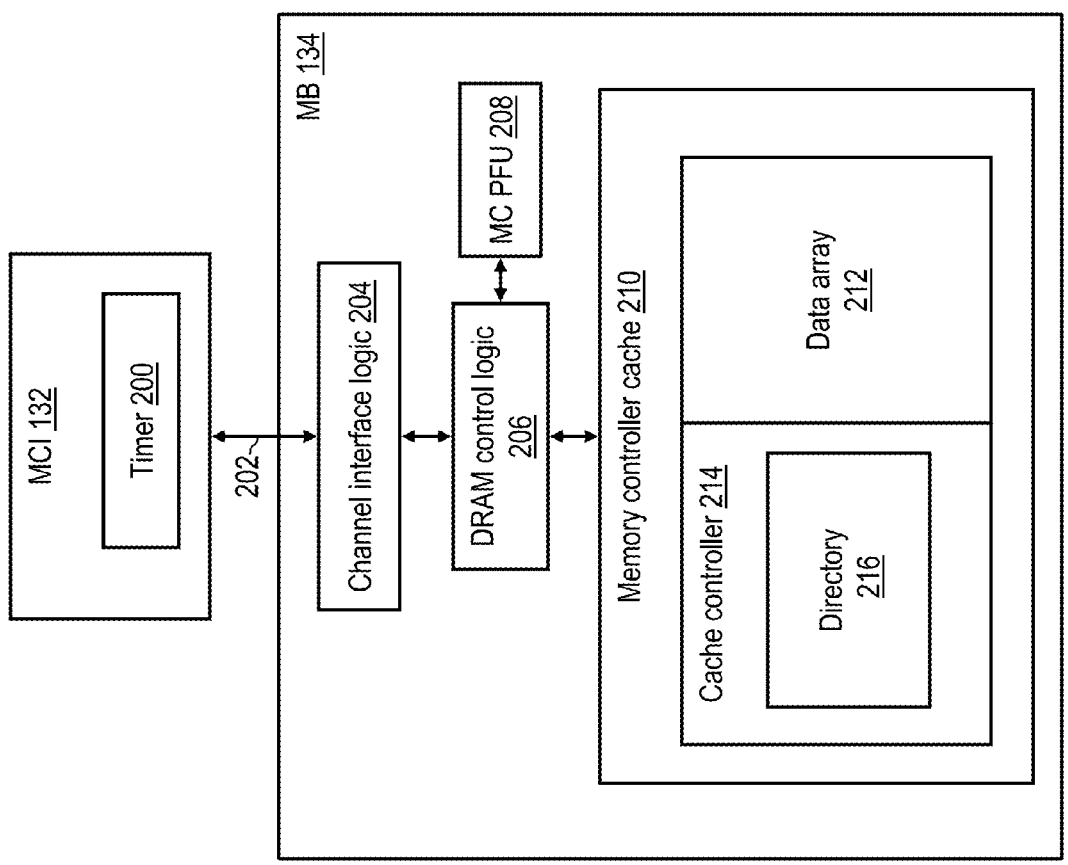
FIG. 2 is a more detailed view of the distributed memory controller of FIG. 1 in accordance with one embodiment.

Referring now to FIG. 2, there is depicted a more detailed view of one of the distributed memory controllers, which in the illustrated embodiment is formed of an on-chip memory channel interface (MCI) 132 and an off-chip memory buffer 134, which is also preferably implemented as an integrated circuit chip. In the depicted embodiment, MCI 132 includes address, control and data interfaces and associated logic adapted to participate in communication of memory access requests, coherence messages and data utilizing the communication protocol of system fabric 130. As illustrated, MCI 132 includes at least one (and preferably more than one) timer 200, which as described below, is utilized by MCI 132 to ensure that the early data delivery technique described herein does not degrade memory access latency.

Memory buffer 134 is coupled to MCI 132 by a memory channel 202. Memory buffer 134 includes channel interface logic 202 that manages frame formatting and decoding, error correction coding, arbitration and other aspects of communication between memory buffer 134 and MCI 132 over memory channel 202. Channel interface logic 204 is coupled to DRAM control logic 206, which initiates read and write accesses to the attached system memory 140 in response to read-type and write-type memory access requests received from the associated MCI 132. DRAM control logic 206 is further coupled to a memory controller prefetch unit (MC PFU) 208 that generates prefetch requests for memory blocks in advance of need based on one or more types of memory access requests received by DRAM control logic 206 from MCI 132. In a preferred embodiment, MC PFU 208 is implemented as a streaming prefetcher that concurrently prefetches memory blocks in multiple concurrent prefetch streams.

MB 134 further includes a memory controller cache 210, which preferably resides at the lowest level of the cache memory hierarchy (e.g., at L3 or L4). In a preferred embodiment, memory controller cache 210 is implemented with a set-associative organization and includes a set-associative data array 212 for storing memory blocks, as well a cache controller 214 including a directory 216 of the contents of data array 212. However, it should be appreciated that in other embodiments other organizations of memory controller cache 210 can be employed, including a multiple entry buffer. The caching policy of memory controller cache 210 can also vary between implementations. That is, memory controller cache 210 can be populated with memory blocks prefetched by MC PFU 208, castout cache lines received by memory buffer 134 from a higher level cache, and/or other memory blocks read from or written to the associated system memory 140.

Figure 3:
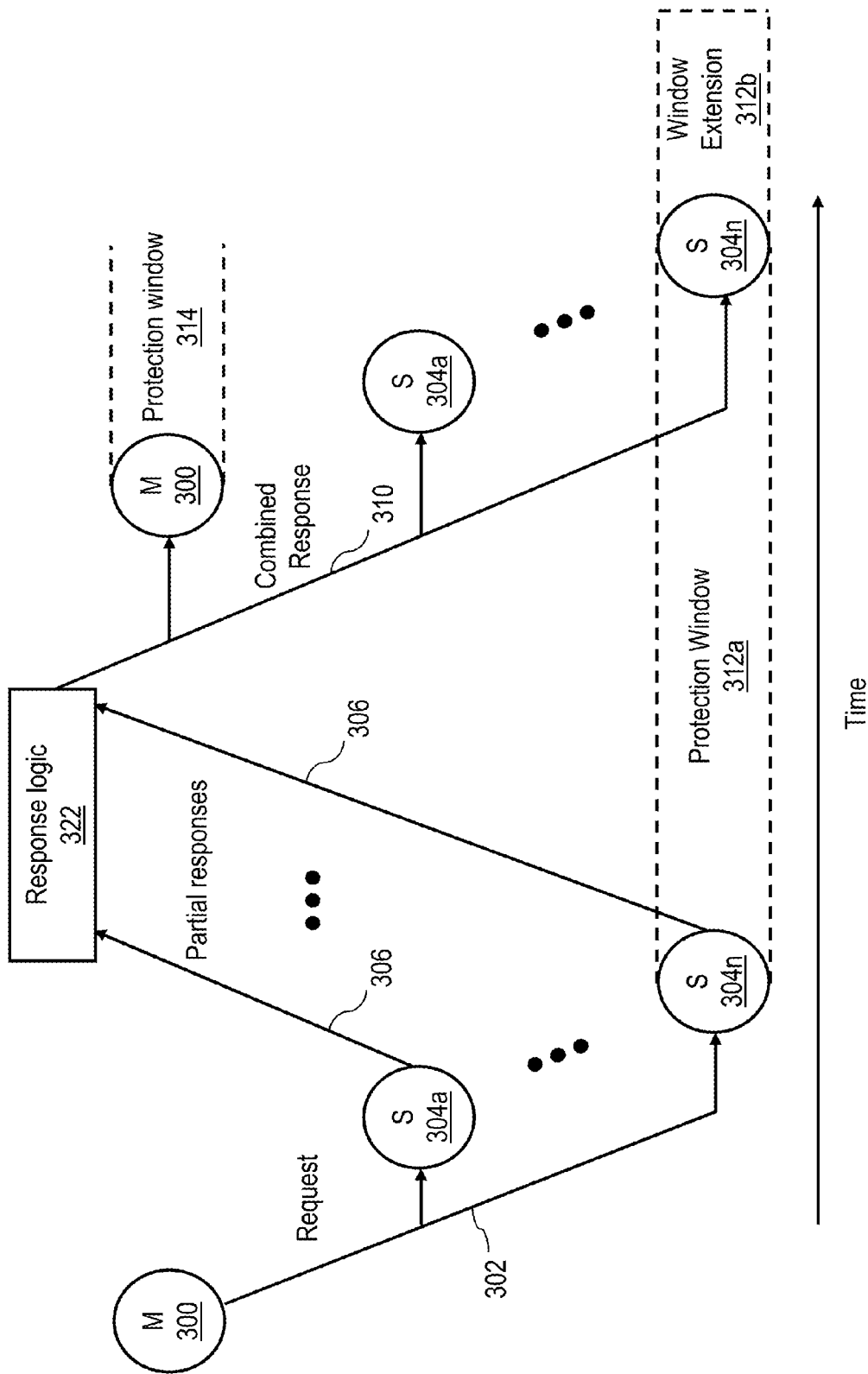
FIG. 3 is a time-space diagram of an exemplary operation of a system fabric of data processing system implementing a snoop-based coherence protocol in accordance with one embodiment.

With reference now to FIG. 3, there is depicted a time-space diagram of an exemplary operation on the system fabric 130 of data processing system 100 of FIG. 1 in accordance with one embodiment of a snoop-based coherence protocol. The operation begins when a master (or requestor) 300 (e.g., a master within an L2 cache 120 or a master within an I/O controller 150) issues a request 302 on system fabric 130. Request 302 preferably includes at least a transaction type indicating a type of desired access and a resource identifier (e.g., real address) indicating a resource to be accessed by the request. Common types of requests preferably include those set forth below in Table I.

TABLE I

| Request | Description |
|---|---|
| READ | Requests a copy of the image of a memory block for query purposes |
| RWITM (Read-With-Intent-To-Modify) | Requests a unique copy of the image of a memory block with the intent to update (modify) it and requires destruction of other copies, if any |

TABLE I-continued

| Request | Description |
| --- | --- |
| BKILL (Background Kill) | Requests invalidation of all cached copies of a target memory block and cancellation of all reservations for the target memory block |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |

Request 302 is received by snoopers 304 distributed throughout data processing system 100, including, for example, snoopers of L2 caches 120 and MCIs 132. In general, with some exceptions, snoopers in the same L2 cache 120 as the master of request 302 do not snoop request 302 (i.e., there is generally no self-snooping) because a request 302 is transmitted on system fabric 130 only if the request 302 cannot be serviced internally by the cache hierarchy of a processing core 104. Snoopers 304 that receive and process requests 302 each provide a respective partial response (Presp) 306 representing the response of at least that snooper 304 to request 302. An MCI 132 determines the partial response 306 to provide based, for example, upon whether the MCI 132 is responsible for the request address and whether it has resources available to service the request. A snooper of an L2 cache 120 may determine its partial response 306 based on, for example, the availability of its L2 array 122 and directory 126 and the coherence state associated with the request address in directory 126.

The partial responses 306 of snoopers 304 are logically combined either in stages or all at once by one or more instances of response logic 322 to determine a systemwide coherence response to request 302, referred to herein as a combined response (Cresp) 310. In one preferred embodiment, which will be assumed hereinafter, the instance of response logic 322 responsible for generating combined response 310 is located in the SOC 102 containing the master 300 that issued request 302. Response logic 322 provides combined response 310 to master 300 and snoopers 304 via system fabric 130 to indicate the response (e.g., success, failure, retry, etc.) to request 302. If combined response 310 indicates success of request 302, combined response 310 may indicate, for example, a data source for a requested memory block, a cache state in which the requested memory block is to be cached by master 300, and whether "cleanup" operations invalidating the requested memory block in one or more caches are required.

In response to receipt of combined response 310, one or more of master 300 and snoopers 304 typically perform one or more actions in order to service request 302. These actions may include supplying data to master 300, invalidating or otherwise updating the coherence state of data cached in one or more caches, performing castout operations, writing back data to a system memory 140, etc. If required or permitted by request 302 and the selected coherence protocol, a requested or target memory block may be transmitted to or from master 300 before or after the generation of combined response 310 by response logic 322.

Still referring to FIG. 3, one of snoopers 304 preferably has the responsibility of protecting the transfer of ownership of a memory block, if necessary, in response to a request 302. In the exemplary scenario shown in FIG. 3, snooper 304n (e.g., the snooper having coherence ownership of the target memory block of request 302) protects the transfer of ownership of the requested memory block to master 300 during a protection window 312a that extends from the time that snooper 304n determines its partial response 306 until snooper 304n receives combined response 310 and during a subsequent window extension 312b extending (preferably, for a programmable time) beyond receipt by snooper 304n of combined response 310. During protection window 312a and window extension 312b, snooper 304n protects the transfer of ownership by providing partial responses 306 to other requests specifying the same request address that prevent other masters from obtaining ownership (e.g., a retry partial response) until ownership has been successfully transferred to master 300. If necessary, master 300 may also likewise initiate a protection window 314 to protect its ownership of the memory block requested in request 302 following receipt of combined response 310.

As will be appreciated by those skilled in the art, the snoop-based coherence protocol illustrated in FIG. 3 may be implemented utilizing multiple diverse sets of coherence states. In a preferred embodiment, the cache coherence states employed within the protocol indicates at least (1) whether the cached copy is unique (i.e., is the only cached copy system-wide), (2) whether and when the cache can provide a copy of the memory block to a master of a memory access request for the memory block, (3) whether the cached image of the memory block is consistent with the corresponding memory block in system memory. These attributes can be expressed, for example, in a variant of the well-known MESI (Modified, Exclusive, Shared, Invalid) protocol including at least the coherence states summarized below in Table II.

TABLE II

| Coherence state | Unique? | Data Source? | Consistent with system memory? |
| --- | --- | --- | --- |
| M (Modified) | Yes | Yes (before Cresp) | No |
| E (Exclusive) | Yes | Yes (before Cresp) | Yes |
| T (Shared-Owner) | Unknown | Yes (after Cresp) | No |
| S (Shared) | Unknown | No | Unknown |
| I (Invalid) | No | No | N/a - data is invalid |

Figure 4:
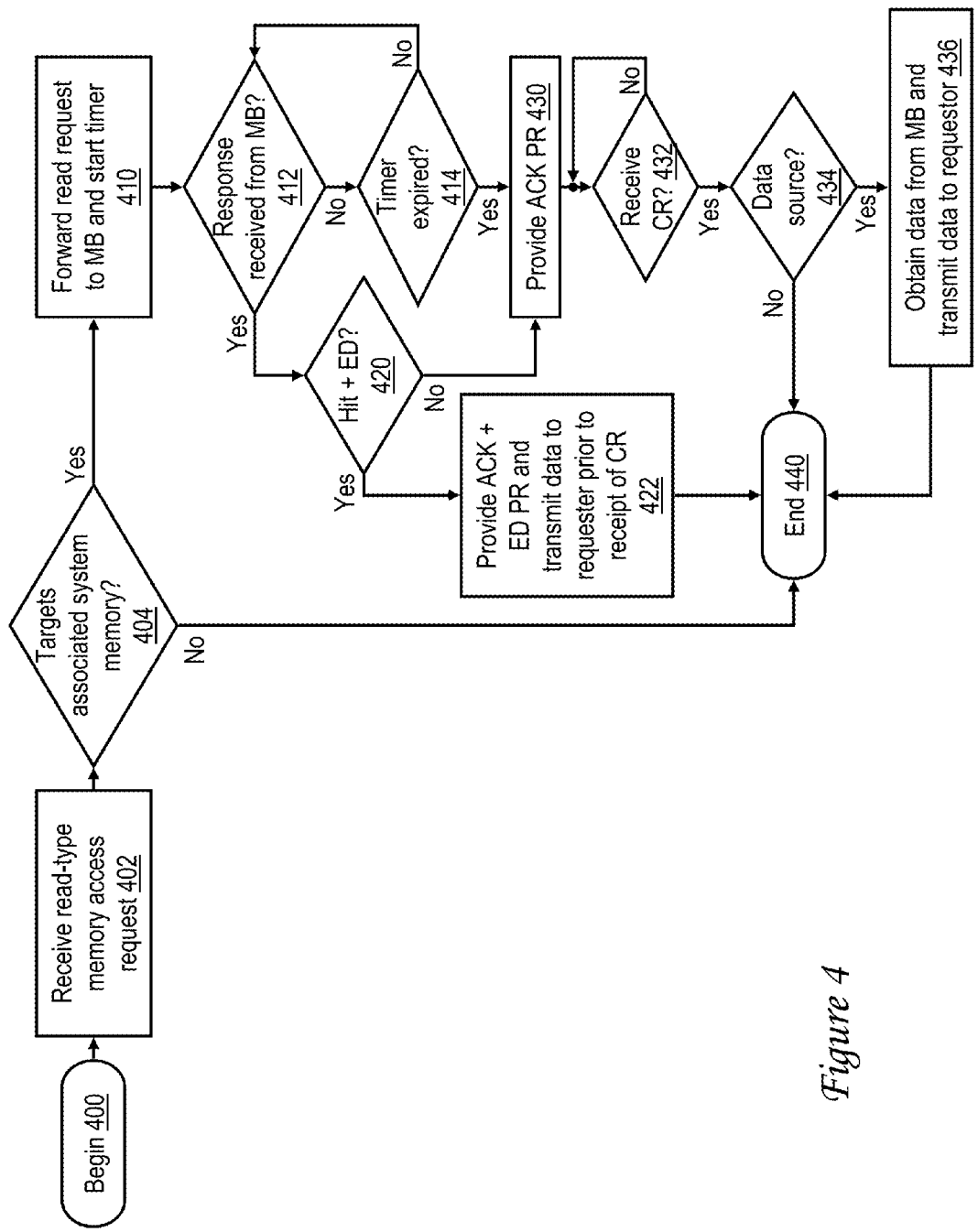
FIG. 4 is a high level logical flowchart of an exemplary method by which a memory channel interface (MCI) responds to a read-type memory access request in accordance with one embodiment.

Referring now to FIG. 4, there is depicted a high level logical flowchart of an exemplary method by which a memory channel interface (MCI) 132 responds to a read-type memory access request in accordance with one embodiment. The exemplary method assumes the snoop-based coherence protocol depicted in FIG. 3.

The process shown in FIG. 4 begins at block 400 and thereafter proceeds to block 402, which illustrates an MCI 132 of data processing system 100 receiving (i.e., snooping) a read-type memory access request (e.g., a READ or RWITM request) on system fabric 130. In response to the read-type memory access request, MCI 132 determines whether or not the target address specified by the read-type memory access request is assigned to a storage location in one of the system memories 140 coupled to the MCI 132 (block 404). If not, MCI 132 discards the read-type memory access request, and the process ends at block 440.

If, however, MCI 132 determines at block 404 that the target address of the read-type memory access request is assigned to a storage location in one of the associated system memories 140, the process proceeds to block 410, which illustrates MCI 132 forwarding the read-type memory access request to the associated memory buffer 134 for lookup of the target address in memory controller cache 210. In embodiments in which memory buffer 134 is not required to respond to memory access requests forwarded by MBI 132 in a bounded time, MCI 132 also starts a timer 200 having a duration substantially equal to the maximum partial response period permitted for partial responses under the snoop-based coherence protocol implemented by data processing system 100. In this manner, any delay in receiving a response from memory buffer 134 will not cause MCI 132 to delay provision of its partial response to the read-type memory access request.

Following block 410, the process proceeds to blocks 412-414, which illustrate MCI 132 awaiting for the first to occur of receipt of (1) a response to the read-type memory access request from memory buffer 134 and (2) expiration of the timer 200. In response to receipt of a response from memory buffer 134 prior to expiration of timer 200, MCI 132 determines at block 420 whether or not the response from memory buffer 134 indicates that the target address hit in directory 216 of memory controller cache 210 in a coherence state in which memory controller cache 210 is permitted to supply "early data," that is, to supply a copy of the target memory block to a requestor prior to the combined response representing the systemwide coherence response to the read-type memory access request. For example, in the exemplary coherence protocol of Table II, a cache memory is permitted to supply early data only if the target memory block is held by that cache memory in either of the M or E coherence states. In response to a determination at block 420 that the response of memory buffer 134 to the read-type memory access request resulted in hit in memory controller cache 210 in a coherence state in which memory controller cache 210 is permitted to supply "early data," MCI 132 transmits on system fabric 130 an ACK+ED partial response acknowledging its ability to service the read-type memory access request and to supply early data to the requestor (block 422). In addition, MCI 132 receives the target memory block from the associated memory buffer 134 and transmits the target memory block to the requestor on system fabric 132 prior to receipt by MCI 132 of the combined response of the read-type memory access request. Thereafter, the process ends at block 440.

Referring again to blocks 414 and 420, in response to the expiration of timer 200 at block 414 prior to receipt by MCI 132 of a response from memory buffer 134 to the read-type memory access request or in response to a determination at block 420 that the response of memory buffer 134 does not indicate that the target address hit in directory 216 of memory controller cache 210 in a coherence state in which memory controller cache 210 is permitted to supply "early data," MCI 132 transmits on system fabric 130 an ACK partial response acknowledging its ability to service the read-type memory access request following receipt of the combined response (block 430). The process proceeds from block 430 to block 432, which depicts MCI 132 awaiting receipt from response logic 322 of the combined response for the read-type memory access request. In response to receipt of the combined response, MCI 132 determines at block 434 whether or not the combined response designates MCI 132 as the data source to supply the target memory block to the requestor. If not, the process of FIG. 4 ends at block 440. If, however, the combined response designates MCI 132 as the data source of the target memory block, MCI 132 obtains the target memory block from the associated memory buffer 134 and transmits the target memory block to the requestor via system fabric 130 (block 436). Thereafter, the process of FIG. 4 ends at block 440.

Figure 5:
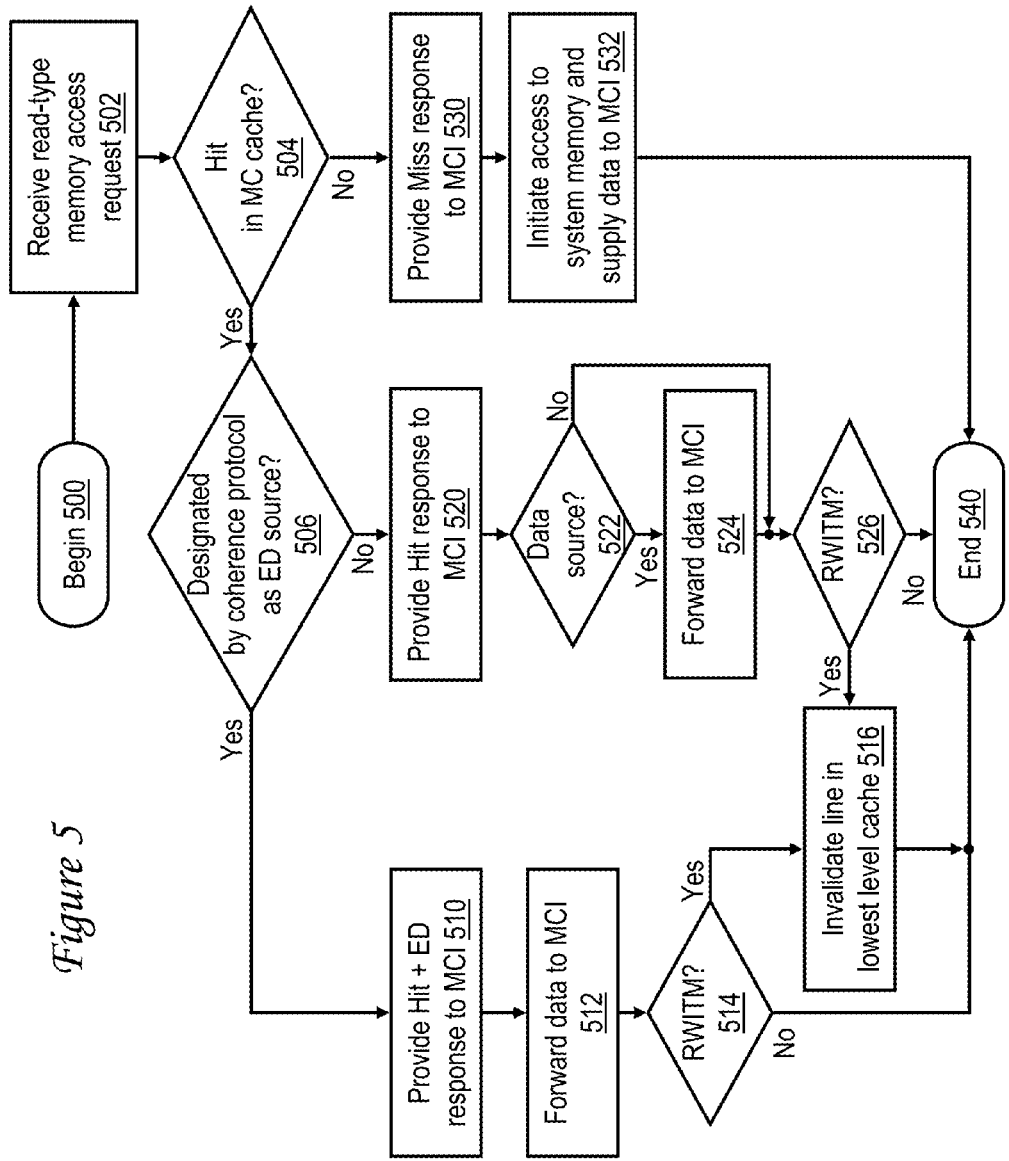
FIG. 5 is a high level logical flowchart of an exemplary method by which a memory buffer (MB) responds to a read-type memory access request in accordance with one embodiment.

With reference now to FIG. 5, there is illustrated a high level logical flowchart of an exemplary method by which a memory buffer 134 responds to a read-type memory access request in accordance with one embodiment. The depicted process begins at block 500 and then proceeds to block 502, which illustrates a memory buffer 134 receiving a read-type memory access request forwarded by its associated MCI 132, as described above with reference to block 410 of FIG. 4. In response to receipt of the read-type memory access, DRAM control logic 206 initiates a lookup of the target address in directory 216 of memory controller cache 210.

As indicated by decision blocks 504-506, the servicing of the read-type memory access request by memory buffer 134 depends on the results of the lookup in directory 216. If the target memory address misses in directory 216, the process proceeds from block 504 to block 530 and following blocks, which are described below. If the target address hits in directory 216 in a coherence state that does not designate memory controller cache 210 as a source of early data for the target memory block (e.g., in either of the T or S states of the exemplary coherence protocol of Table II), the process proceeds from block 506 to block 520 and following blocks, which are described below. If, however, the target address hits in directory 216 in a coherence state designating memory controller cache 210 as the source of early data for the target memory block (e.g., in either of the M or E coherence states of the exemplary coherence protocol of Table II), the process proceeds to block 510. It should be appreciated that in embodiments employing a different coherence protocol than that given in Table II, coherence states other than or in addition to the M and E states may be utilized to designate memory controller cache 210 as a source of early data for the target memory block.

Block 510 illustrates DRAM control logic 206 providing the associated MCI 132 a Hit+ED response to the read-type memory access request, indicating that memory controller cache 210 can serve as a source of early data, as previously described with respect to block 420 of FIG. 4. At block 512, DRAM control logic 206 additionally forwards a copy of the target memory block to the associated MCI 132. If the read-type memory access request is a RWITM request that requires exclusive access to the target memory block to permit it to be updated, DRAM control logic 206 further directs memory controller cache 210 to invalidate its copy of the target memory block, as depicted at blocks 514-516. Thereafter, the process of FIG. 5 ends at block 540.

Referring now to block 520, in response to a determination that the target address hit in directory 216 in a coherence state that does not designate memory controller cache 210 as a source of early data for the target memory block (e.g., the coherence state is either T or S), DRAM control logic 206 provides a Hit response to the associated MCI 132. In addition, if the coherence state associated with the target address in directory 216 indicates that memory controller cache 210 will be the data source for the target memory block after combined response (e.g., the coherence state is the T), DRAM control logic 206 forwards a copy of the target memory block to the associated MCI 132, as shown at blocks 522-524. If the read-type memory access request is a RWITM request that requires exclusive access to the target memory block to permit it to be updated, DRAM control logic 206 further directs memory controller cache 210 to invalidate its copy of the target memory block, as depicted at blocks 526 and 516. Thereafter, the process of FIG. 5 ends at block 540.

Referring now to block 530, in response to a determination that the target address misses in directory 216, DRAM control logic 206 provides a Miss response to the associated MCI 132. In addition, DRAM control logic 206 may initiate access to one or more of the associated system memories 140 to obtain the target memory block of the read-type memory access request and supply the target memory block to MCI 132 (block 532). In various embodiments, DRAM control logic 206 may initiate such access to system memories 140 speculatively in advance of receipt of confirmation from MCI 132 that the combined response designates MCI 132 as the data source of the target memory block. In other embodiments, DRAM control logic 206 may initiate access to one or more of the associated system memories 140 to obtain a copy of the target memory block only in response to receipt of confirmation from MCI 132 that the combined response designates MCI 132 as the data source of the target memory block. Following block 532, the process of FIG. 5 ends at block 540.

Figure 6:
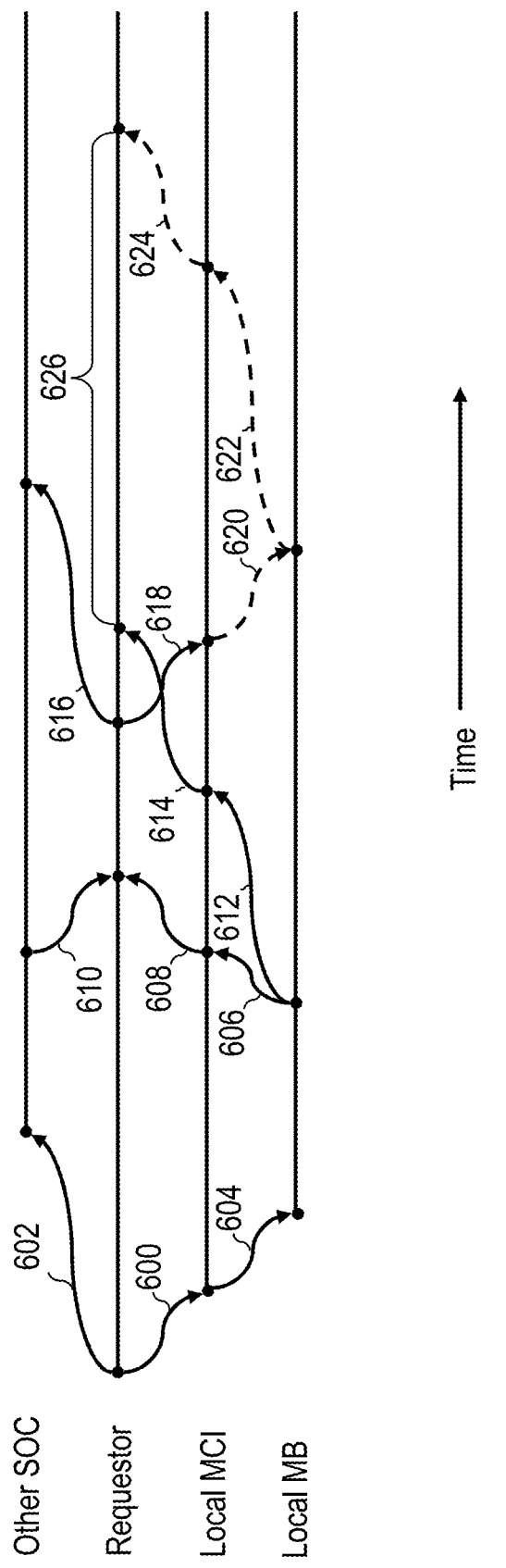
FIG. 6 is a time-space diagram of the servicing of an exemplary read-type memory access request by a distributed memory controller in accordance with one embodiment.

Referring now to FIG. 6, there is depicted a time-space diagram of an exemplary operating scenario in which a read-type memory access request is serviced by a distributed memory controller in accordance with the processes of FIGS. 4-5. In the exemplary operating scenario, the exemplary read-type memory access request targets a memory block residing in one or more of the system memories 140 controlled by a distributed memory controller (i.e., IMC 132) local to (i.e., on the same SOC 102 as) the requestor (e.g., L2 cache 120 or I/O controller 150).

The illustrated operating scenario begins as a requestor broadcasts a read-type memory access request on system fabric 130. As indicated by arrow 600, the broadcast of the read-type memory access request is received first by snoopers in the same SOC 102 as the requestor, including the local MCI 132 assigned the target memory address. The broadcast of the read-type memory access request is subsequently received by snoopers in other SOCs 102, as indicated by arrow 602.

In response to receipt of the read-type memory access request, the MCI 132 forwards the read-type memory access request to its associated memory buffer 134, as illustrated by arrow 604 and as previously described with reference to block 410 of FIG. 4 and block 502 of FIG. 5. In response to the target address of the read-type memory access request hitting in directory 216 of memory controller cache 210 in a coherence state (e.g., the E state) that permits memory controller cache 210 to serve as a source of early data, memory buffer 134 provides a Hit+ED response to the read-type memory access request as depicted at arrow 606, and as previously described with respect to block 510 of FIG. 5. Based on the response received from the memory buffer 134, MCI 132 provides an ACK+ED partial response to the read-type memory access request via the system fabric 130, as shown at reference numeral 608. Snoopers on other SOCs 102 similarly provide their partial responses as depicted by arrow 610.

As represented by arrow 612, memory buffer 134 also forwards a copy of the target memory block from memory controller cache 210 to MCI 132. MCI 132, in turn, transmits the target memory block to the requestor prior to receipt by MCI 132 of the combined response of the read-type memory access request, as represented by arrow 614. Following transmission of the target memory block, response logic 322 in the SOC 102 of the requestor (here shown to be collocated with the requestor for ease of illustration) broadcasts the combined response for the read-type memory access request on system fabric 130, as illustrated at reference numerals 616 and 618.

It should be noted that in the absence of the delivery of early data in accordance with the techniques described herein, MCI 132 would request the target memory block of the read-type memory access request from the memory buffer 134 in response to receipt of the combined response as shown at reference 620, and memory buffer 134 would return the target memory block to MCI 132 as represented by arrow 622. Thereafter, MCI 132 would provide the requested memory block to the requestor via system fabric 130, as shown by arrow 624. Interval 626 thus represents the latency savings realized by enabling memory controller cache 210 to supply early data as described herein. It should also be noted that because MCI 132 provides its partial response 608 no later than the maximum partial response period enforced by timer 200 regardless of any response by memory buffer 134, variability of timing in the communication between MCI 132 and memory buffer 134 does not delay the determination of the combined response or the ultimate delivery of data, and in the worst case, results in data delivery no later than would be achieved if early delivery of data was not supported.

Figure 7:
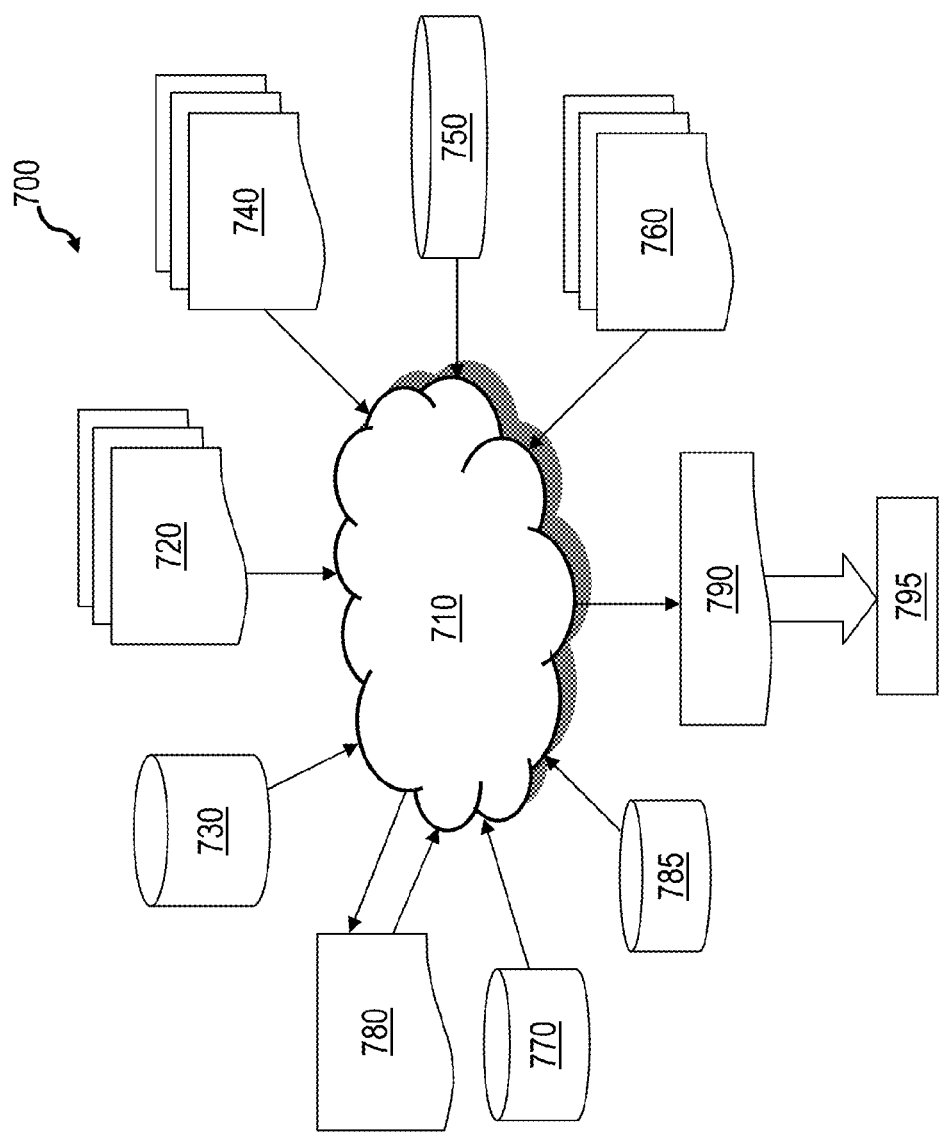
FIG. 7 is a data flow diagram of an exemplary design process.

Referring now to FIG. 7, there is depicted a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown above. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures disclosed above to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention disclosed herein. In one embodiment, design structure 790 may comprise a compiled, executable HDL simulation model that functionally simulates the devices disclosed above.

Design structure 790 may also employ a data format used for the exchange of layout data of integrated circuits and/or symbolic data format (e.g., information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above. Design structure 790 may then proceed to a stage 795 where, for example, design structure 790: proceeds to tape-out, is released to manufacturing, is released to a mask house, is sent to another design house, is sent back to the customer, etc.

As has been described, in at least one embodiment, in response to snooping a read-type memory access request of a requestor on a system fabric of a data processing system, a memory channel interface forwards the request to a memory buffer and starts a timer. In response to the forwarded request, the memory buffer performs a lookup of a target address of the request in a memory controller cache. In response to the target address hitting in a coherence state permitting provision of early data, the memory buffer provides a response indicating early data and provides a copy of a target memory block of the request to the memory channel interface. The memory channel interface, responsive to receipt prior to expiration of the timer of the response indicating early data, transmits the copy of the target memory block to the requestor via the system fabric prior to receiving a combined response of the data processing system to the request.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a computer-readable storage device (e.g., volatile or non-volatile memory, optical or magnetic disk or other statutory manufacture) that stores program code that can be processed by a data processing system. Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. A method of data processing in a data processing system, comprising:
   controlling access to a system memory utilizing a distributed memory controller including a memory channel interface coupled by a memory channel to a memory buffer interposed between the memory channel interface and the system memory;
   in response to snooping a read-type memory access request of a requestor on a system fabric of the data processing system, the memory channel interface forwarding the read-type memory access request via the memory channel to the memory buffer and starting a timer;
   in response to the forwarded read-type memory access request, the memory buffer performing a lookup of a target address of the read-type memory access request in a memory controller cache;
   in response to the lookup resulting in a hit in a coherence state permitting provision of early data, the memory buffer providing a response to the memory channel interface indicating early data and providing a copy of a target memory block of the read-type memory access request to the memory channel interface; and
   the memory channel interface, responsive to receipt prior to expiration of the timer of the response from the memory buffer indicating early data, transmitting the copy of the target memory block to the requestor via the system fabric prior to receiving a combined response of the data processing system to the read-type memory access request.

2. The method of claim 1, and further comprising:
   the memory controller interface, responsive to receipt of the response from the memory buffer indicating early data prior to expiration of the timer, providing a partial response to the read-type memory access request that indicates the memory controller interface will transmit a copy of the target memory block to the requestor prior to receiving the combined response.

3. The method of claim 1, and further comprising:
   the memory channel interface, responsive to receipt after expiration of the timer of the response from the memory buffer indicating early data, transmitting the copy of the target memory block to the requestor via the system fabric in response to receiving the combined response of the data processing system to the read-type memory access request.

4. The method of claim 1, wherein the memory controller cache is a set-associative cache.

5. The method of claim 1, wherein the coherence state indicates that the memory controller cache is an only cache in the data processing holding a valid copy of the target memory block.

6. The method of claim 1, and further comprising:
   the timer expiring at a duration no greater than a maximum partial response period of a snoop-based coherence protocol implemented by the data processing system.

* * * * *